June 3, 1947.  A. A. STUART, JR  2,421,583
DEGAUSSING SYSTEM
Filed Sept. 2, 1944
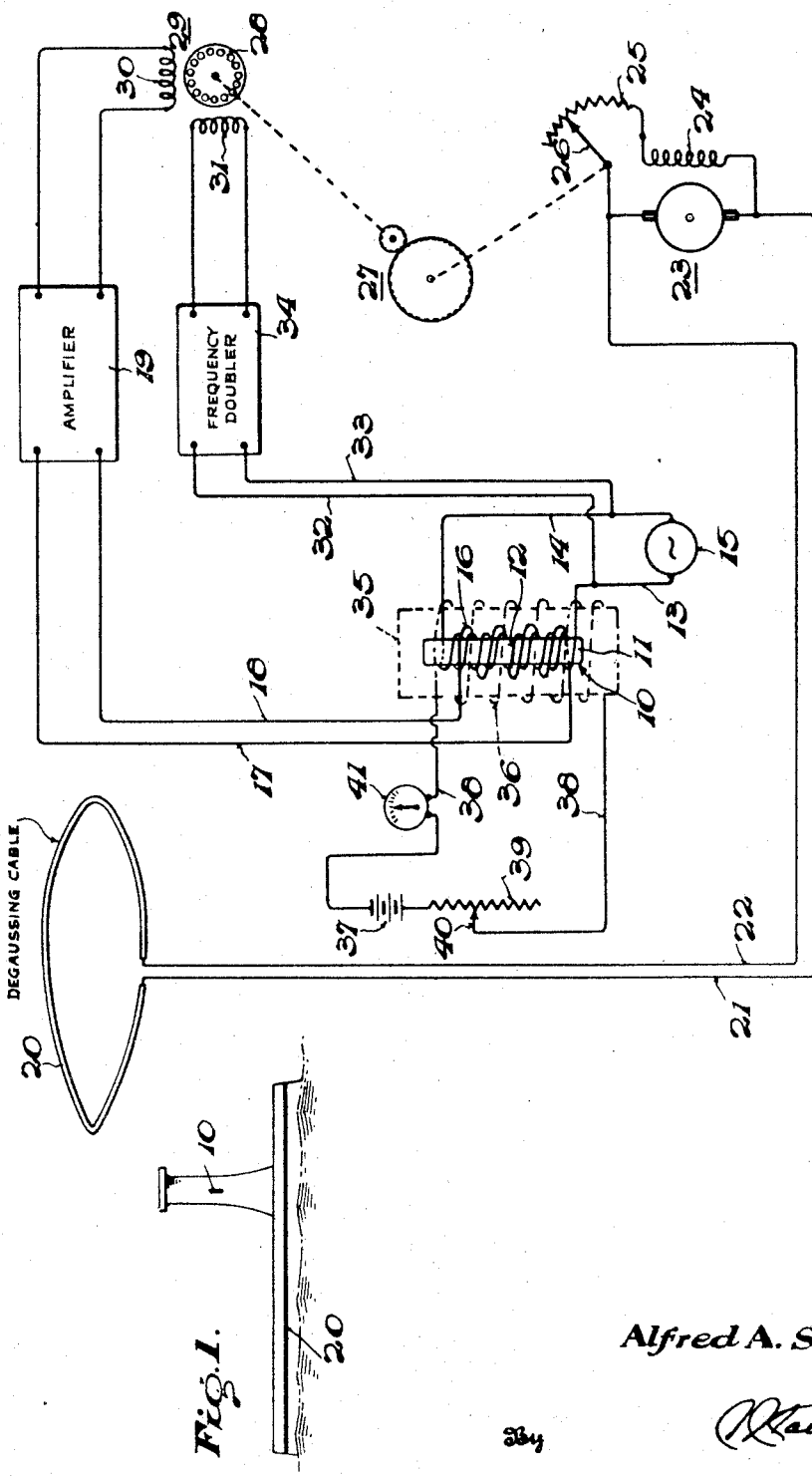
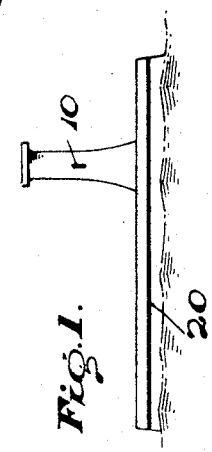
Fig.1.
Fig.2.
Inventor
Alfred A. Stuart, Jr.
By
Attorney

Patented June 3, 1947

2,421,583

UNITED STATES PATENT OFFICE 2,421,583

DEGAUSSING SYSTEM

Alfred A. Stuart, Jr., Hasbrouck Heights, N. J., assignor to Bendix Aviation Corporation, Teterboro, N. J., a corporation of Delaware Application September 2, 1944, Serial No. 552,476

11 Claims. (Cl. 114—240)

This invention relates to control systems generally and more particularly to a system wherein the effect of a magnetic field within a localized area may be neutralized and maintained so notwithstanding the variation of magnetic fields developed from other sources which would otherwise have a tendency to develop undesirable magnetic fields within the localized area.

It is well known to those skilled in the art that because of the magnetism of steel ships they were subjected to the hazards of magnetically responsive explosives such as magnetic mines, for example. Mines of this character are designed to possess a number of magnetic needles, each arranged in a predetermined normal plane, which are actuated from their normal planes in response to the magnetic field of a ship passing thereover to set off the explosive. To counteract this hazard it has been proposed to utilize current carrying cables mounted about the ship, such cables being commonly known as degaussing belts. The difficulty with this known expedient, however, has been that once the current flow within the cable had been adjusted to provide a local field sufficient to neutralize the then existing field of the ship, the ship's magnetism varies continuously thereby making the field developed about the cable useless for neutralizing purposes.

An object of the present invention, therefore, is to provide a novel and automatic control system whereby the varying magnetism of a localized area may be neutralized by another varying and locally developed magnetic field.

Another object of the invention is to provide novel degaussing systems for marine vessels which will at all times operate to neutralize the magnetism of the vessels and thereby protect them against magnetically attracted hazards.

A further object is to provide a novel system of the character described comprising an inductor element which responds to the magnetic field of a local area to develop a signal for energizing a generator fed cable or conductor surrounding the area and developing thereby a local field about the area to neutralize the magnetic field initially present in the local area.

Besides constituting a safeguard for marine vessels against magnetic hazards, the novel system of the present invention may be applied to other and various uses, one being an industrial application where it is desired to maintain the magnetic field about a given machine in a factory neutralized notwithstanding the presence of external and variable fields which would otherwise tend to develop magnetic fields in the vicinity of the machine.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention.

In the drawings, wherein like reference characters refer to like parts in both views, Figure 1 is a schematic showing of the installation of the essential elements of the present invention aboard a marine vessel; and Figure 2 is a circuit diagram of the novel control system of the present invention.

Referring now to the drawings and more particularly to Figure 2 thereof, the present invention is shown as comprising an inductor element 10 having a core 11 of magnetically permeable material provided with a primary or exciting winding 12 thereon connected through leads 13 and 14 with a suitable source 15 of alternating current together with a secondary or output winding 16 which connects by way of conductors 17 and 18 with the input of a conventional vacuum tube amplifier 19.

Inductor devices of this general character are known and their operation consists chiefly in that as exciting current, either alternating or pulsating, is fed into the primary windings the core member becomes periodically saturated and unsaturated. If a magnetic field threads the core, i. e., when the core is arranged in any position relative to the magnetic field other than that normal thereto, the field will enter and leave the core for each half cycle of the fundamental current. Due to the action of the external field, pulses are induced within the secondary or output winding whereby a voltage is generated therein having a frequency double the frequency of the fundamental. Since the inductor element depends upon the presence of magnetic fields which it is designed to detect, in the absence of such a field the element will not generate a signal at the output winding. For a better understanding of the theory and operation of devices of this general character reference is made to U. S. Patent No. 2,240,680, issued May 6, 1941.

Inductor element 10 is installed at some suitable point above or below the deck corresponding to a position found to be correct by experiment so as to be in a zero strength magnetic field when the current flow in the cable or degaussing belt coil 20 is of the correct value, i. e., the magnetic field of the ship is neutralized by the local magnetic field generated about the cable or belt. In accordance with the novel features of the present invention, the inductor element is arranged to automatically regulate the current fed to the cable or belt so as to counteract the magnetism of the ship itself and thus render the ship immune to danger from magnetic mines.

The belt or cable 20 is connected through leads 21 and 22 with a direct current generator 23 whose field winding 24 is variably energized by virtue of a resistor 25 connected thereto and cooperating with a movably mounted contact element 26 which is drivably connected through a suitable gear train 27 with the rotor 28 of a two phase induction motor 29. Thus in accordance with the operation of motor 29 as well as its direction of operation the field winding of the generator will be so adjusted as to feed the required amount of direct current into cable or belt 20.

The ship's magnetism is initially detected by inductor element 10, as heretofore described, and a signal proportional to the strength and direction of the ship's magnetic field is generated within output winding 16 which is fed into and amplified within amplifier 19, the output of which feeds the second or variable phase winding 30 of motor 29. The first or fixed phase winding 31 of the motor is energized from source 15 by way of conductors 32 and 33. Inasmuch as the frequency of the current traversing motor winding 30 is twice the frequency of the fundamental or exciting current it is desirable to interpose a conventional frequency doubler 34 between motor winding 31 and energizing source 15. Moreover, to provide for proper phase displacement of the current within motor windings 30 and 31, a suitable condenser or phase shifting network (not shown) may be arranged within amplifier 19 as is well known with the use of such induction motors.

Inasmuch as it is desired to consider and work with only the magnetic field resulting from the ship's magnetism itself, it is desirable to eliminate any interference which would otherwise occur from the earth's magnetic field. To this end, therefore, inductor element 10 is mounted within a suitable cylinder 35 which is sealably closed at both ends and provided on its outer periphery with a winding 36 which is connected to a source of direct current, such as a battery 37, for example, by way of leads 38 through a current adjustor comprising a resistor 39 and a movable cooperating contact 40. It is desirable to initially remove the inductor 10 from the ship and the influence of the ship's magnetism and adjust the current flow within winding 36 until a value is obtained, shown on a meter 41 in the circuit, which develops a local magnetic field just sufficient to neutralize the magnetism of the earth's field. The desired neutralizing condition will be arrived at when the output of secondary 16 of inductor 10 will be zero.

One manner of determining the best position and location of inductor element 10 on the ship is to place a second and exactly similar inductor device on the ocean bottom in shallow water, in the same position that a magnetic mine would occupy, and connect it to shore or to a small boat at anchor several hundred feet away from the ship. The ship mounting inductor element 10 is passed over the submerged inductor element and the current of belt 20 adjusted until the ship is properly degaussed, this condition being manifested when the output of the submerged inductor passes through zero, indicating a zero field for the ship. At the same time, the inductor element 10 on the ship is moved around manually until a position is approached where the output of the secondary of the inductor element 10 is zero. After the inductor on the ship has once been positioned, it is adapted for use henceforth to provide control for the correct degaussing current for other positions of the ship. The second inductor element should be provided with a neutralizing coil or winding similar to winding 36 to neutralize the magnetism due to the earth's magnetic field so that only the ship's magnetism is considered. Another manner of accomplishing the same purpose is to provide a vertical permanent magnet adjusted to cancel the earth's vertical field at each of the inductor elements so that the two will give zero output when the ship's field alone is neutralized by the belt current, otherwise the belt current would be cancelling the sum of the earth's field as well as the ship's field which is undesirable since only the ship's field should be cancelled by the belt current.

Assuming now a condition where the belt current is of such value that the local magnetic field developed about the belt is sufficient to counteract the field resulting from the ship's magnetism, the output of secondary 16 of inductor 10 will be zero. However, as soon as the ship's magnetism is varied due to, for example, the firing of guns aboard thereof, or for some other reason, the balanced condition is destroyed and the current within the belt is insufficient or greater than that necessary to neutralize the ship's magnetism so that a resultant magnetic field is developed. This resultant field, however, is immediately detected by inductor 10 whereupon currents are generated in the output thereof, at a frequency double the frequency of the fundamental, amplified within amplifier 19 and fed to energize the variable phase 30 of motor 29, the fixed phase 31 being constantly energized, whereupon the motor operates to drive contact 26 relative to field resistor 25 to vary the generator output until the current flowing in cable 20 is of such a value as to develop a local magnetic field sufficient to neutralize the aforementioned resultant field of the ship at which time the signal at the output of inductor 10 drops to zero and motor 29 becomes de-energized. Depending upon whether the current in the belt is too high or too low, the inductor output will be such as to cause the motor to turn in the correct direction to adjust the resistor to its proper value, the system being initially arranged so that the magnetic field of the cable will always have a direction opposite to the direction of the magnetic field of the vessel. It is now apparent that as the magnetic field of the ship varies the belt will be automatically fed with the correct current to maintain a zero field.

The present invention has been hereinabove illustrated and described in connection with the degaussing of steel vessels, however, it may be applied equally as well to various other uses such as industrial uses. For example, it may be desired to maintain a given area within a factory free from stray magnetic fields such as those occurring during the passage of metal masses near the given area that it is desired to maintain free of magnetic action. In such an event, the belt 20 is arranged to surround the given area and one or more inductor elements arranged outside of the area which will respond to the stray magnetic fields developed by passing objects which would otherwise cause their field to act within the given area being considered. The inductor element or elements will generate a signal or signals in response to such fields to operate the motor and adjust current flow within the belt, as heretofore described, until the current is sufficient to develop a local field of such intensity as to neutralize the stray fields.

Although but a single embodiment of the in-

I claim:

1. In combination with an object inclined to develop an unwanted variable magnetic field, neutralizing means adapted upon controlled energization to develop a local magnetic field to neutralize the magnetic field of said object, means for energizing the neutralizing means, and control means responsive to the magnetic field of said object for controlling the energization of said neutralizing means.

2. In combination with an object inclined to develop an unwanted variable magnetic field, neutralizing means surrounding said object and adapted upon controlled energization to develop a local magnetic field to neutralize the magnetic field of said object, means for energizing the neutralizing means, and control means responsive to the magnetic field of said object for controlling the energization of said neutralizing means, said control means being satisfied when the local field neutralizes the field of said object.

3. In combination with a vessel having thereon iron masses which develop a varying magnetic field, neutralizing means carried by said vessel and adapted upon controlled energization to develop a local magnetic field to neutralize the vessel's magnetic field, means for energizing said neutralizing means, and control means carried by said vessel and responsive to the vessel's magnetic field for controlling the energization of said neutralizing means.

4. In combination with a vessel having thereon iron masses which develop a varying magnetic field, a degaussing cable carried by the vessel, means for energizing said cable whereby a local magnetic field is developed thereby for neutralizing the magnetic field of said vessel, and means responsive to the magnetic field of said vessel for controlling the operation of said energizing means.

5. In combination with a vessel having thereon iron masses which develop a varying magnetic field, a degaussing cable carried by the vessel, a source of current for energizing said cable whereby a local magnetic field is developed thereby for neutralizing the magnetic field of said vessel, and a magnetic induction device carried by said vessel and responsive to the magnetic field of said vessel for controlling the current supplied to said cable.

6. In combination with a vessel having thereon iron masses which develop a varying magnetic field, a degaussing cable carried by the vessel, a controllable source of current for energizing said cable whereby a local magnetic field is developed thereby for neutralizing the magnetic field of said vessel, driving means for operating said controllable source of current, and a magnetic induction device carried by said vessel and responsive to the magnetic field of said vessel for energizing said driving means.

7. In combination with a vessel having thereon iron masses which develop a varying magnetic field, a degaussing cable carried by and surrounding said vessel, a source of current for energizing said cable whereby a local magnetic field is developed thereby for neutralizing the magnetic field of said vessel, and means comprising a magnetic induction device carried by said vessel and responsive to the magnetic field of said vessel for controlling current flow from said source to said cable to keep the magnetic field of said vessel neutralized by said field.

8. In combination with a vessel having thereon iron masses which develop a varying magnetic field, said vessel being further subject to the earth's magnetic field, a degaussing cable carried by said vessel, a source of current for energizing said cable whereby a local magnetic field is developed thereby for neutralizing only the magnetic field of said vessel, means comprising a magnetic induction device carried by said vessel and responsive to the magnetic field of said vessel for controlling current flow from said source to said cable to keep the magnetic field of said vessel neutralized by said local field, and means adjacent said induction device for neutralizing the earth's magnetic field.

9. The method of eliminating the effect of a local magnetic field and that of the earth's magnetic field upon a predetermined area comprising the steps of neutralizing the earth's magnetic field, detecting the intensity of the local magnetic field, and developing about said area another magnetic field having the same intensity as that of the local field but of an opposite direction.

10. Apparatus for maintaining a predetermined area normally subject to a variable magnetic field free of the effect of such magnetic field comprising neutralizing means surrounding the area and adapted upon controlled energization to develop a local magnetic field to neutralize the magnetic field within said area, means for energizing the neutralizing means, and control means responsive to said variable field for controlling the energization of said neutralizing means.

11. Apparatus for maintaining a predetermined area normally subject to a variable magnetic field free of the effect of such magnetic field comprising a degaussing member for surrounding the area, a source of current for energizing said member whereby a local magnetic field is developed thereby for neutralizing the magnetic field within said area, and means comprising a magnetic induction device responsive to the variable magnetic field within said area for controlling current flow from said source to said member to keep the magnetic field within said area neutralized by said local field.

ALFRED A. STUART, JR.

REFERENCES CITED

The following references are of record in the file of this patent:

UNITED STATES PATENTS

| Number | Name | Date |
|---|---|---|
| 2,252,059 | Barth | Aug. 12, 1941 |

FOREIGN PATENTS

| Number | Country | Date |
|---|---|---|
| 113,337 | Australia | June 19, 1941 |